United States Patent [19]

Murakami et al.

[11] Patent Number: 6,108,674
[45] Date of Patent: *Aug. 22, 2000

[54] IMAGE OUTPUT DEVICES WHICH AUTOMATICALLY SELECTS AND OUTPUTS A STORED SELECTED IMAGE IN CORRESPONDENCE WITH INPUT DATA

[75] Inventors: Yoichi Murakami, Ome; Hitoshi Miyaki, Sayama; Yoshiaki Shinbori, Akishima; Hiroki Atsumi, Tachikawa, all of Japan

[73] Assignee: Casio Computer Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/895,549

[22] Filed: Jul. 16, 1997

Related U.S. Application Data

[63] Continuation of application No. 08/446,050, May 19, 1995, abandoned.

[30] Foreign Application Priority Data

Jun. 28, 1994 [JP] Japan .................................. 6-167473
Jun. 28, 1994 [JP] Japan .................................. 6-167474
Jun. 28, 1994 [JP] Japan .................................. 6-167475

[51] Int. Cl.$^7$ .................................................. G06F 17/22
[52] U.S. Cl. ........................................... 707/515; 707/104
[58] Field of Search .................................... 395/762, 777, 395/603, 604, 615, 34, 62, 63; 707/501, 514, 515, 3, 4, 104

[56] References Cited

U.S. PATENT DOCUMENTS

| | | | |
|---|---|---|---|
| 4,899,292 | 2/1990 | Montagna et al. | 395/147 |
| 5,179,652 | 1/1993 | Rosmanith et al. | 395/155 |
| 5,404,435 | 4/1995 | Rosenbaum | 395/147 |
| 5,428,727 | 6/1995 | Kurosu et al. | 395/147 |
| 5,553,277 | 9/1996 | Hirano et al. | 395/615 |
| 5,708,805 | 1/1998 | Okamoto et al. | 395/603 |

OTHER PUBLICATIONS

*Microsoft Office 6–in–1, New Edition,* Que Corporation, 1994, pp. 396–402, 448–453 and Screen printouts 1–7.

Microsoft PowerPoint, Version 4.0c, Microsoft Corporation, 1994, screen printouts 1–7.

Parkinson, "Software Suites: integrated software grows up", Computer Shopper, Apr. 1994, v14, n4, p522(6).

Parkinson, "CE adds color, multiple views in Calendar-Maker upgrade", MacWeek, Nov. 1992, v6, n42, p. 6.

Cohen, "Design presentation calendars in Windows with Calendar Creator Plus", Computer Shopper, Mar. 1993, v13 n3, p. 856.

*Primary Examiner*—Stephen S. Hong
*Attorney, Agent, or Firm*—Frishauf, Holtz, Goodman, Langer & Chick, P.C.

[57] ABSTRACT

An image output device includes an image memory for storing image data in correspondence to each of a plurality of image identification data; an image classification data memory for storing a plurality of image classification data for each image identification data; and a keyboard for inputting to the image output device a desired number of desired image classification data. A central processing unit is provided for retrieving, from the image classification data memory, image identification data indicative of all the respective image classification data input by the keyboard, for further limiting retrieval of the retrieved image identification data to image identification data which is common to a plurality of image classification data input by the keyboard, for extracting from the image memory image data corresponding to the image identification data further retrieved by the central processing unit, and for outputting the extracted image data.

2 Claims, 19 Drawing Sheets

| No. | IMAGE DATA | IMAGE CLASS. DATA |
|---|---|---|
| 1 |  | SUNFLOWER<br>SUMMER<br>FLOWER |
| 120 |  | CHILD<br>BOY |
| 121 |  | TREE<br>CHRISTMAS<br>DECEMBER |

| FILE NAME | IMAGE DATA | |
|---|---|---|
| FIG.001 |  | IMAGE MEMORY |
| FIG.002 |  | |
| FIG.003 |  | |

FIG.8

| FILE NAME | IMAGE CLASSIFICATION DATA |
|---|---|
| FIG.001 | TENT,CAMP,OUTDOOR,LEISURE..... |
| FIG.002 | KNIFE, EDGED,BLADE,CAMP,OUTDOOR,LEISURE..... |
| FIG.003 | COOLER BOX,COOLER,FISHING,OUTDOOR,LEISURE TIME AMUSUMENT,CAMP..... |
| | ⋮ |
| FIG.049 | LANDSCAPE,AUTUMN, MOUNTAIN, FOREST,..... |
| FIG.050 | LANDSCAPE,SUMMER, YACHT, COCONUT TREES,SEA..... |
| FIG.051 | LANDSCAPE,SUMMER, POOL, SWIMMING,..... |
| | ⋮ |

IMAGE CLASSIFICATION DATA MEMORY

FIG.9

| KEYWORD No. | (1) | (2) | (3) |
|---|---|---|---|
| FILE NAME | | | |

**RETRIEVAL RESULT
WORK MEMORY**

INPUT BUFFER     RETRIEVAL WORK MEMORY     FILE NAMES OF IMAGE TO BE OUTPUT

FIG.14

| ILLUST. No. | IMAGE CLASS. DATA | IMAGE DATA | MONTH DATA | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| 1 | MEETING | | 1 | 0 | 0 | 0 | 0 | 0 | 0 | 0 | 0 | 0 | 0 | 0 |
| 10 | MEETING | | 1 | 0 | 0 | 0 | 0 | 0 | 0 | 0 | 0 | 0 | 0 | 0 |
| 50 | SPORT | | 1 | 1 | 1 | 0 | 0 | 0 | 0 | 0 | 0 | 0 | 0 | 1 |
| 100 | MEETING | | 0 | 0 | 0 | 0 | 0 | 0 | 0 | 0 | 0 | 0 | 0 | 1 |
| 101 | | | | | | | | | | | | | | |

ILLUSTRATION MEMORY

RETRIEVAL RESULT
WORK MEMORY

NEWS OF NEW YEAR'S PARTY

HAPPY NEW YEAR TO YOU.
○○ DIVISION IS PLANNING
ITS USUAL NEW YEAR'S PARTY.
PLEASE, JOIN IT POSITIVELY;

DATE : JANUARY 10
7:00 P.M.

PLACE : AT TAVERN ○×

FEE : ¥5,000 PER MALE
¥3,000 PER FEMALE

6,108,674

IMAGE OUTPUT DEVICES WHICH AUTOMATICALLY SELECTS AND OUTPUTS A STORED SELECTED IMAGE IN CORRESPONDENCE WITH INPUT DATA

This application is a Continuation, of application Ser. No. 08/446,050, filed May 19, 1995 abandoned.

BACKGROUND OF THE INVENTION

1. Field of the Invention

The present invention relates to image output devices which select a desired image from among a plurality of images stored beforehand and outputs the selected image.

2. Description of the Related Art

Generally, when various letters of invitation/materials for presentation are created by a document processor such as a word processor or a personal computer, images related to the contents of documents to be created are inserted into the respective documents to render the letters of invitation, etc., full of expression, so as to have an increased persuasive force/delightfulness. To this end, various image data is stored beforehand in an unchangeable manner in the document processor. The user outputs desired image data from among the stored data in one of the following conventional manners:

(1) The user selects a desired file name from among a displayed list of file names each given to each image data stored on a file-per-image basis;

(2) The user selects a desired image from among various actually displayed image candidates; and (3) The user selects any one of the names of classifications into which various image data is classified beforehand, causes a list of file names corresponding to the selected name of classification to be displayed and selects a desired file name from among the displayed list.

When the user outputs an image, he beforehand knows an effective image to be inserted. In the above method (1), however, it is difficult for the user to imagine an image intuitively from the language of a file name alone. As a result, images must be output many times before a desired one which satisfies the user is located, resulting in much undesirably spent labor and time.

In the above method (2), image candidates are displayed actually and hence the user is able to immediately determine which image is satisfactory. However, if there are many images, the display screen must be switched many times, so that much labor and time would be spent before a desired image which satisfies the user is located, as in the above method (1).

In the above method (3), images are classified so that the contents of the list of file names are narrowed to some extent by selection of the name of a classification. One image is put in a classification area according to this method. For example, assume that an illustration where there are coconut trees in a sandy beach, yachts floating in the distance, and gigantic columns of clouds floating in the sky corresponds to a classification "Summer". Even if the user tries to select an illustration of a scene in which yachts float, he cannot output that illustration as long as he does not select "Summer" as the classification name. Thus, this method is not necessarily an efficient one.

SUMMARY OF THE INVENTION

It is therefore a first object of the present invention to provide an image output device which, when the device extracts one-image data from among various image data stored beforehand and outputs the extracted data along with document data, is capable of automatically extracting image information matching with the contents of the document data.

A second object of the present invention is to provide an image output device which, when the device extracts one-image data from among various image data stored beforehand and outputs the extracted data along with document data, is capable of automatically extracting image information matching with any input character row data.

A third object of the present invention is to provide an image output device which, when the device extracts one-image data from among various image data stored beforehand and outputs the extracted data along with document data, is capable of automatically extracting image information matching with a season/month in accordance with data on the current recorded time.

In order to achieve the above objects, the present invention provides an image output device including:

image storage means for storing image data for each of a plurality of image numbers;

character string storage means for storing character string data in correspondence to each of the image numbers;

document storage means for storing document data;

retrieval means for retrieving the document data to locate character string data coinciding with the character string data contained in the document data among the plurality of character string data stored in the character string storage means;

extraction means for extracting from the image storage means image data corresponding to an image number which corresponds to the located character string data in accordance with the image number; and output means for outputting the image data extracted by the extraction means along with the document data.

Therefore, when the device extracts one-image data from among various image data stored beforehand and outputs the extracted data along with document data, the image output device is capable of automatically extracting image information matching with the contents of document data, any input character string data, or a season/month in accordance with data on the current recorded time.

BRIEF DESCRIPTION OF THE DRAWINGS

FIG. 8 shows the contents of an image classification data memory 16;

FIG. 9 shows the structure of a retrieval result work memory 17;

FIG. 14 shows a part of an illustration memory 26 of the third embodiment;

DETAILED DESCRIPTION OF THE PREFERRED EMBODIMENTS

First Embodiment

Figure 1:
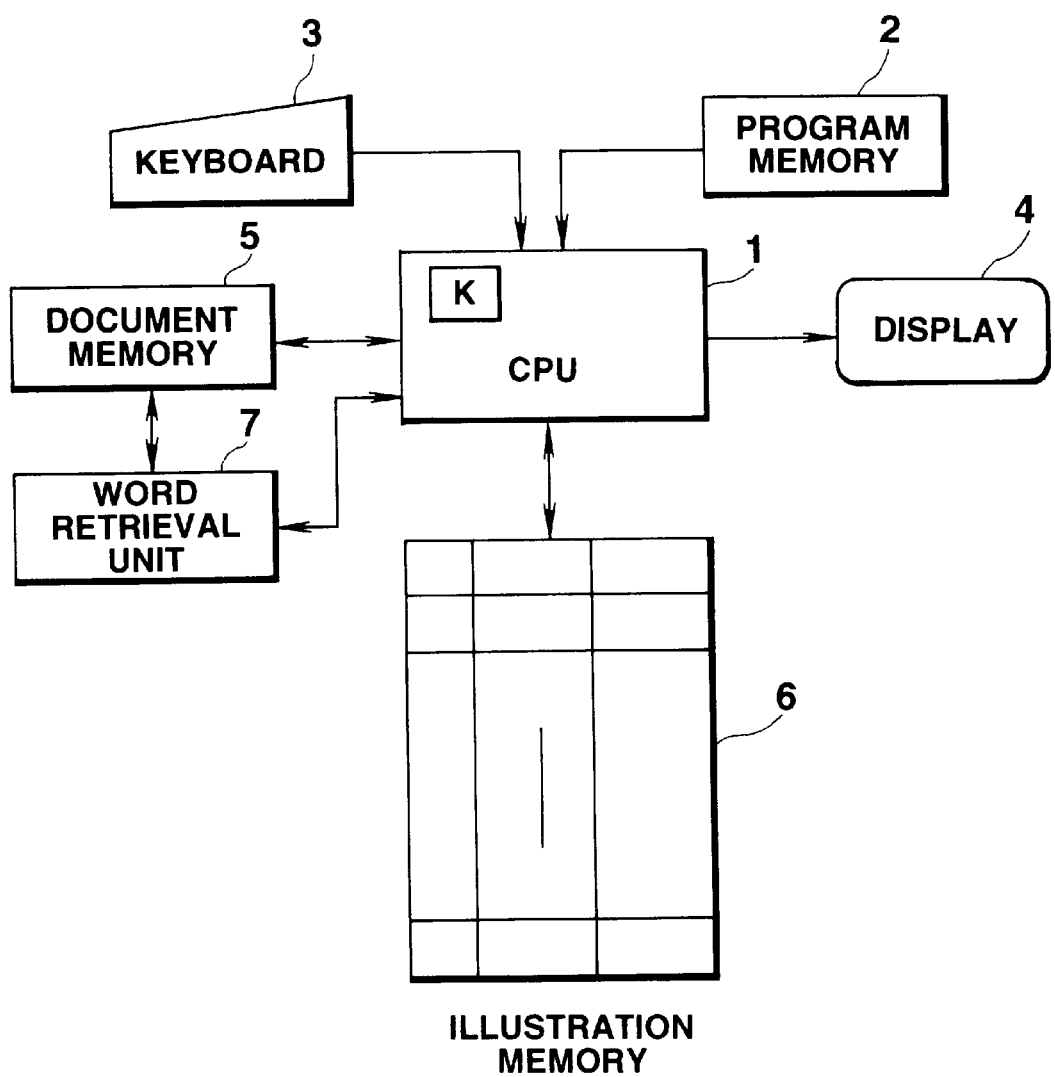
FIG. 1 is a block diagram indicative of the structure of an image output device of a first embodiment of the present invention.

An image output device of a first embodiment of the present invention will be described with reference to FIGS. 1–5 of the accompanying drawings. FIG. 1 is a block diagram indicative of the structure of the image output device applied to a word processor.

A CPU (Central Processing Unit) 1 controls the whole operation of the image output device in accordance with various programs stored in a memory program 2. Given an image output command from a keyboard 3, the CPU 1 starts up an image output program in the program memory 2.

The keyboard 3 is used to enter document data in addition to various commands including the image output command. Document data provided through the keyboard 3 is displayed on the display 4 and is then stored in the document memory 5.

When the CPU 1 receives an image output command from the keyboard 3, it fetches image classification data from an illustration memory 6, starts up a word retrieval unit 7, sequentially compares the respective character strings fetched from the document memory 5 by the word retrieval unit 7 and the image classification data, and determines whether a character string which matches with the image classification data is contained in the document memory 5. If so, the CPU 1 reads from the illustration memory 6 an illustration corresponding to the image classification data, and displays it as a candidate to be selected on the display 4.

Figure 2:
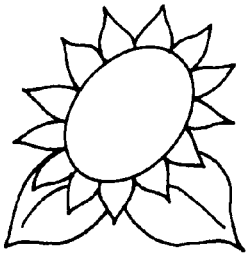
FIG. 2 shows a part of the structure of an illustration memory 6.
Figure 2:
Figure 2:

As shown in FIG. 2, the illustration memory 6 stores image data on an illustration and document classification data in correspondence to a (sequential) illustration number. The image classification data represents a language which causes the user to imagine an illustration, a general, common or simplified name of the illustration and a season/month indicative of an optimal term of use of the illustration. A plurality of image classification data is preset for one image in an unchangeable manner. For example, image classification data which includes "sunflower", "summer" and "flower" is set for image data having an illustration No. "1". Image classification data which includes data "tree", "Christmas", "December" is set for image data having an illustration No. "121".

The word retrieval unit 7 extracts the contents of the document memory 5 one word at a time as a character string to be retrieved, starting with the head of the contents of the document memory and sequentially extracts the respective words of each single clause from the document memory 5, and sequentially delivers them to the CPU 1.

Figure 3:
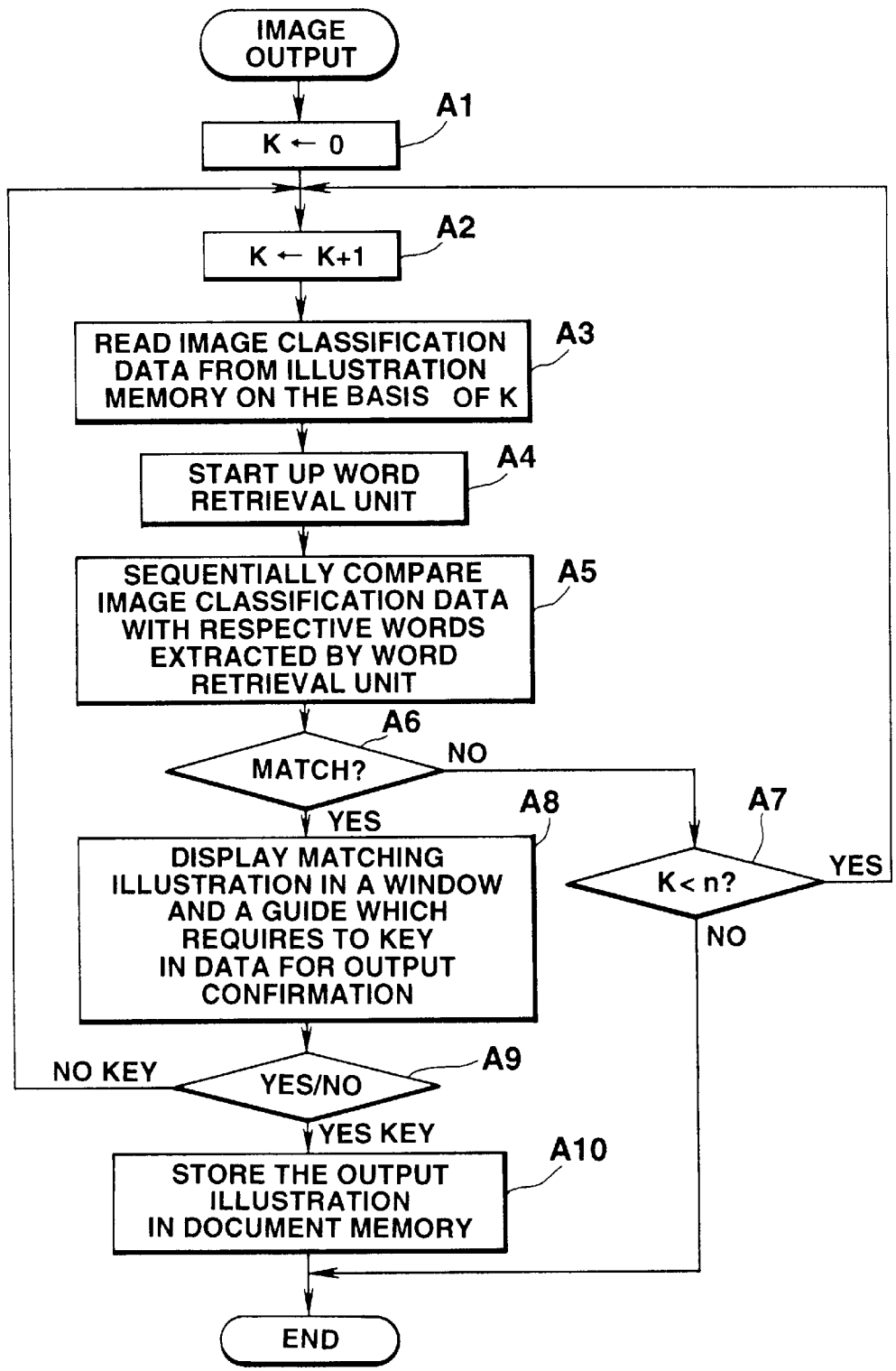
FIG. 3 is a flowchart of an image output operation.

The operation of this embodiment will be described with reference to a flowchart of FIG. 3, which is indicative of a program executed when an image output instruction is keyed in through the keyboard 3.

Figure 4A:
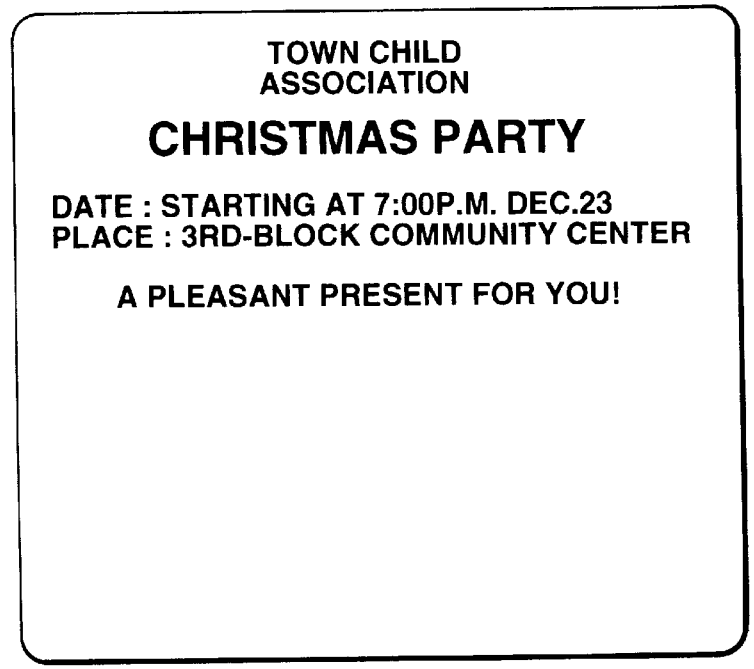
FIGS. 4A, 4B show a document under creation and a document having an inserted illustration therein, respectively.

As shown in FIG. 4A, when an image output command is entered via the keyboard 3 to insert into an invitation to a Christmas party an illustration matching the contents of the document after the document is created, the CPU 1 clears its illustration counter K which addresses the illustration numbers in the illustration memory 6 one at a time (step Al) and updates the address by incrementing the value of the illustration counter K by one (step A2). Thus, the CPU 1 initially designates the illustration number "1" of the illustration memory 6 in accordance with the value of the illustration counter K and reads image classification data "sunflower", "summer" and "flower" corresponding to the illustration number "1" (step A3). The CPU 1 then activates the word retrieval unit 7 (step A4). The word retrieval unit 7 sequentially retrieves document data in the document memory 5 from its head to its end to thereby extract a respective one of document rows of each single clause. For example, in the document of FIG. 4A, character strings "town child association", "Christmas party", "date", "7 p.m. on December 23", "place", "3rd-block community center", "pleasant", and "present for you !" are extracted. When the word retrieval unit 7 extracts character strings of each clause from the document memory 5, the CPU 1 sequentially compares the respective character strings and the image classification data (step A5). As a result, at the next step A6, the CPU checks whether the document contains a character string matching with any item of the image classification data. Since the document of FIG. 4A does not contain a character string corresponding to any item of the image classification data for the illustration number "1", control returns to a process for incrementing the value of the illustration counter K (step A2) on the condition that the value of the illustration counter K is less than the end illustration number n in the illustration memory 6 (step A7).

Figure 5:
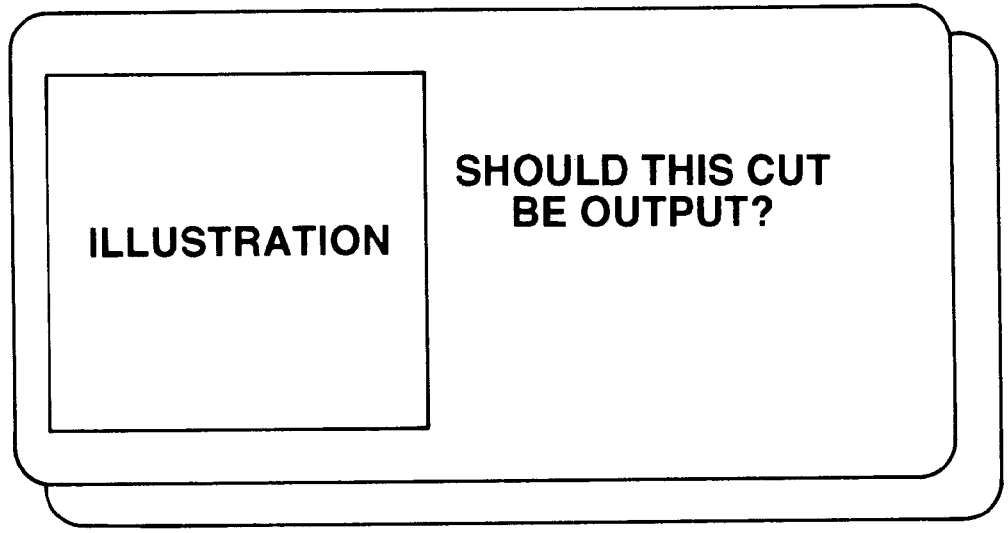
FIG. 5 shows a display screen on which an illustration is displayed as a candidate to be selected.

When the value of the illustration counter K is updated to "120" by iteration of such operations (step A2–A7), image classification data "child" and "boy" corresponding to the illustration number "120" is read out from the illustration memory 6 (step A3). In this case, since the character string "child" corresponding to the image classification data is contained in the document shown in FIG. 4A, it is detected at step A6. Control then passes to step A8, where the CPU reads the illustration data corresponding to the value of the illustration counter K from the illustration memory 6 and displays the read data in the window and also displays a guide which requires data input for output confirmation. FIG. 5 shows the display screen in this case where an illustration is displayed in a rectangular frame and a message to confirm whether the illustration should be output or not is displayed outside the frame. When an illustration displayed as a candidate is to be output, a key "YES" is operated. If otherwise, a key "NO" is operated.

Figure 4B:
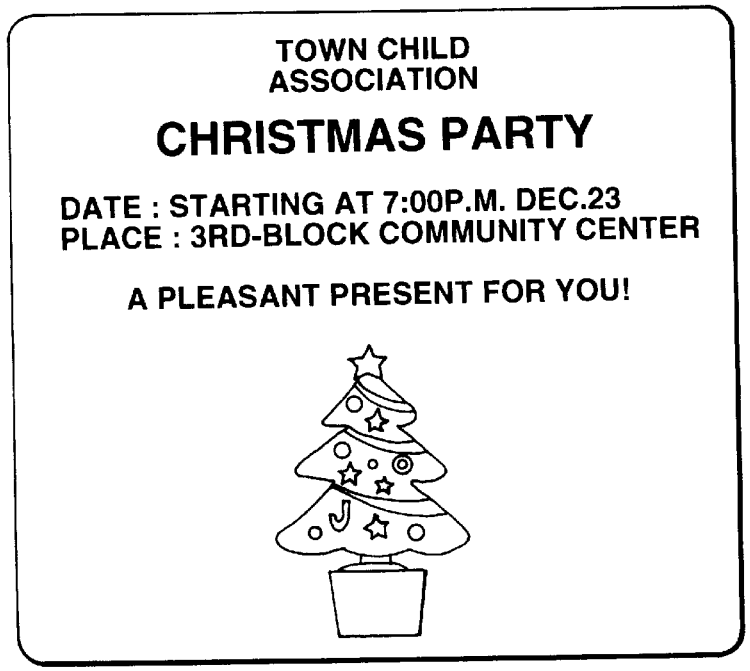

When the key "NO" is operated, control returns to step A2, where the value of the illustration counter K is incremented to become "121". Thus, image classification data "tree", "Christmas", and "December" corresponding to the illustration number "121" is read from the illustration memory 6 (step A3). Since character strings corresponding to the image classification data "Christmas" and "December" are contained in the document shown in FIG. 4A, an illustration corresponding to the illustration number "121" is displayed as a candidate to be selected in the window (step A8). When the key "YES" is operated at this time, the illustration displayed at present is inserted at a designated position in the document memory 5 (step A10). FIG. 4B shows a display screen produced when the illustration is inserted into the document in this way. The position where the illustration is inserted is the current position of the cursor. Before the image output command is keyed in, the cursor may be moved beforehand to any designated position where the image should be inserted. Alternatively, after the key "YES" is operated, the cursor may be moved to any designated position where the image should be inserted.

As described above, according to the present embodiment, since the contents of the document memory 5 are analyzed in response to an image output command, and the illustration memory 6 is retrieved, using a character string contained in the document as a keyword, an illustration matching the contents of the document into which the illustration should be inserted is output automatically on the basis of the contents of the document.

Second Embodiment

Figure 6:
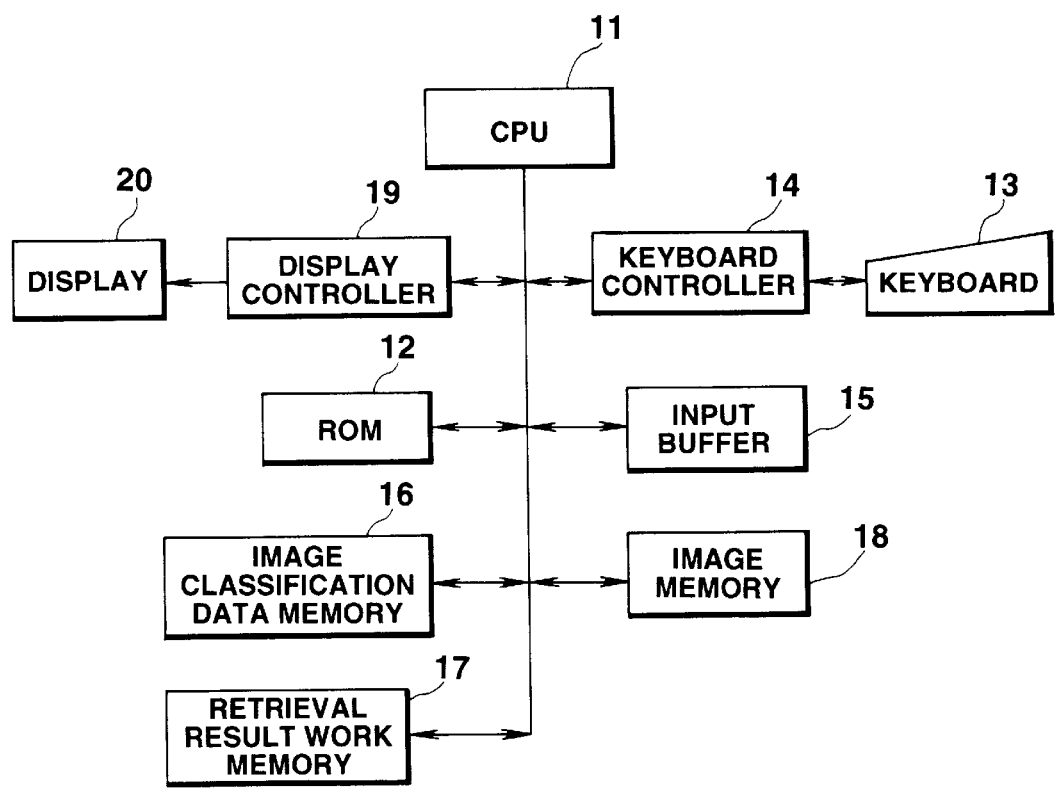
FIG. 6 is a block diagram of the structure of an image output device as a second embodiment of the present invention.

Referring to FIGS. 6–12, a second embodiment of the present invention will be described. FIG. 6 is a block diagram indicative of an image output device.

A CPU 11 controls the whole operation of the image output device in accordance with various programs stored in a ROM 12. When the CPU 11 receives an image output command from a keyboard controller 14 through a keyboard 13, it starts up an image output program stored in the ROM 12.

In addition to keying in various commands including an image output command, the keyboard 13 is capable of keying in character string data for Japanese hiragana and katakana characters. When the CPU 11 receives any character string which gives an image of an object, to be output, from the keyboard 13 when the image is to be output, it stores the character string as a keyword for image output in an input buffer 15. The CPU 11 retrieves the image classification data memory 6, using as a keyword the character string stored in the input buffer 15, stores the result of the retrieval in a retrieval result work memory 17, accesses an image memory 18 on the basis of the contents of the retrieval result work memory 17, reads the corresponding image data from the image memory 18, delivers the read data to a display controller 19 and displays the image data as a candidate to be selected on the display screen.

Figure 7:
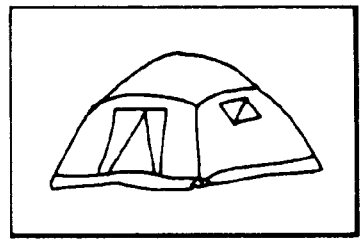
FIG. 7 shows a part of an image memory 18.
Figure 7:
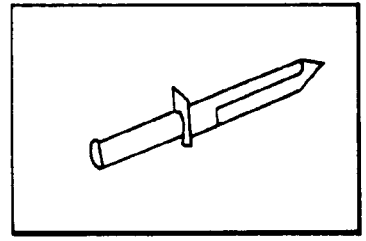
Figure 7:
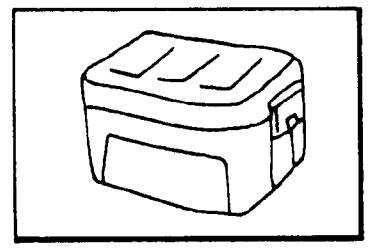

FIG. 7 illustrates a part of image data (illustrations, symbols, marks, etc.,) stored beforehand in an unchangeable manner in the image memory 18. The image data is stored on a file-per-image basis. The respective image data have corresponding file names FIG. 001, FIG. 002, FIG. 003, ... The image data having the file name "FIG. 001", "FIG. 002", and "FIG. 003" represent illustrations of a camping tent, a knife for leisure time amusement, and a cooler box, respectively. Illustration data having a file name FIG. 050 (not shown in FIG. 7) represents an illustration where "there are coconut trees in a sandy beach, boats floating in the distance and gigantic columns of clouds floating in the sky".

FIG. 8 specifically shows a part of the contents of the image classification data memory 16 which stores a plurality of character strings as image classification data for each file name of image data. The image classification data represents a language which causes the user to imagine an image; a general, common, or simplified name of the image; use of the image; the name of each of a plurality of components, if any, of the image with a plurality of image classification data corresponding to one image. For example, as image classification data corresponding to an image having a file name FIG. 002, a "knife", an "edged blade" whose general name is notated in Chinese characters; and "camp", "outdoor", "leisure", . . . whose uses are shown are contained in an unchangeable manner in the image classification data memory 16.

FIG. 9 shows the structure of a retrieval result work memory 17. When the CPU 11 receives any character string as a keyword from a keyboard 13, it retrieves the image classification data memory 16 on the basis of the keyword. At this time, if image classification data matching with the keyword is contained in the image classification data memory 16, a file name corresponding to the image classification data is read and written into the retrieval result work memory 17. As shown in FIGS. 12D and 12E, in the present embodiment, the input buffer 15 is capable of storing three kinds of keywords at the maximum. In correspondence to the three kinds of keywords, the retrieval result work memory 17 has three areas; that is, a keyword No. "1" area which stores a file name retrieved on the basis of a first keyword, a keyword No. "2" area which stores a file name retrieved on the basis of a second keyword, and a keyword No. "3" area which stores a file name retrieved on the basis of an end keyword.

The operation of this embodiment will be described with reference to the flowchart of FIGS. 10A, 10B, and 11, which indicate the operation of the image output device executed in accordance with an image output program started up when an image output command is input to the CPU 11 through the keyboard 13.

Assume now that, for example, an image related to the contents of a document such as a letter of invitation to be created should be inserted into the document. In this case, in order to selectively output desired image data from among various image data stored beforehand in an unchangeable manner in the image memory 18, the user keys in through the keyboard 13 as keywords character strings which represent a language and a name matching with the impression of a desired image.

The CPU 11 is now in a waiting state where the CPU 11 waits for a keyword keyed in from the keyboard 13. When the CPU receives a keyword from the keyboard 13, it displays the keyword on the display screen, and performs a keyword inputting process where the keyword is stored in the input buffer 15 (step S1). The CPU then checks whether the end of the keyword input is designated (step S2). When two or more kinds of character strings are input as keywords, control returns to the keyword inputting process (step S1). At this time, a comma and the next character string should be keyed in to discriminate the respective character strings.

When the end of the keying-in operation is designated after the character strings which cause the user to imagine the image are keyed in as a keyword for image outputting, the CPU 11 first designates the head file name in the image classification data memory 16 (step S3), and designates the first keyword in the input buffer 15 (sep S4). The CPU then sequentially compares the designated keyword with the respective image classification data corresponding to the designated file name (step S5), and checks whether image classification data matching with the keyword is present in the image classification data memory 16 in correspondence to the designated file name (step S6).

If not, the CPU designates the next keyword (step S11) on the condition that there is another input keyword in the input buffer 15 (step S10), and thereafter sequentially compares the designated keyword and the respective image classification data corresponding to the designated file name (step S5).

Figure 12A:
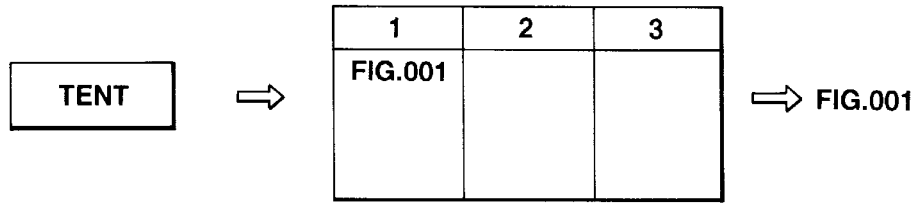
FIGS. 12A, 12B, 12C, 12D, and 12E each show a file name(s) stored in the retrieval result work memory 17 in accordance with a result of the retrieval of the image classification data memory 16 on the basis of a keyword in an input buffer 15 and the file name of an image to be output on the basis of the contents of the retrieval result work memory.

Assume now that, as shown in FIG. 12A, a character string "tent" has been input as a keyword in the input buffer 5. In this case, since this character string is contained in the image classification data corresponding to the head file name FIG. 001 in the image classification data memory 16, control passes to step S7, where a file name storage process is performed in which the appropriate file name is stored in the retrieval result work memory 17.

Figure 11:
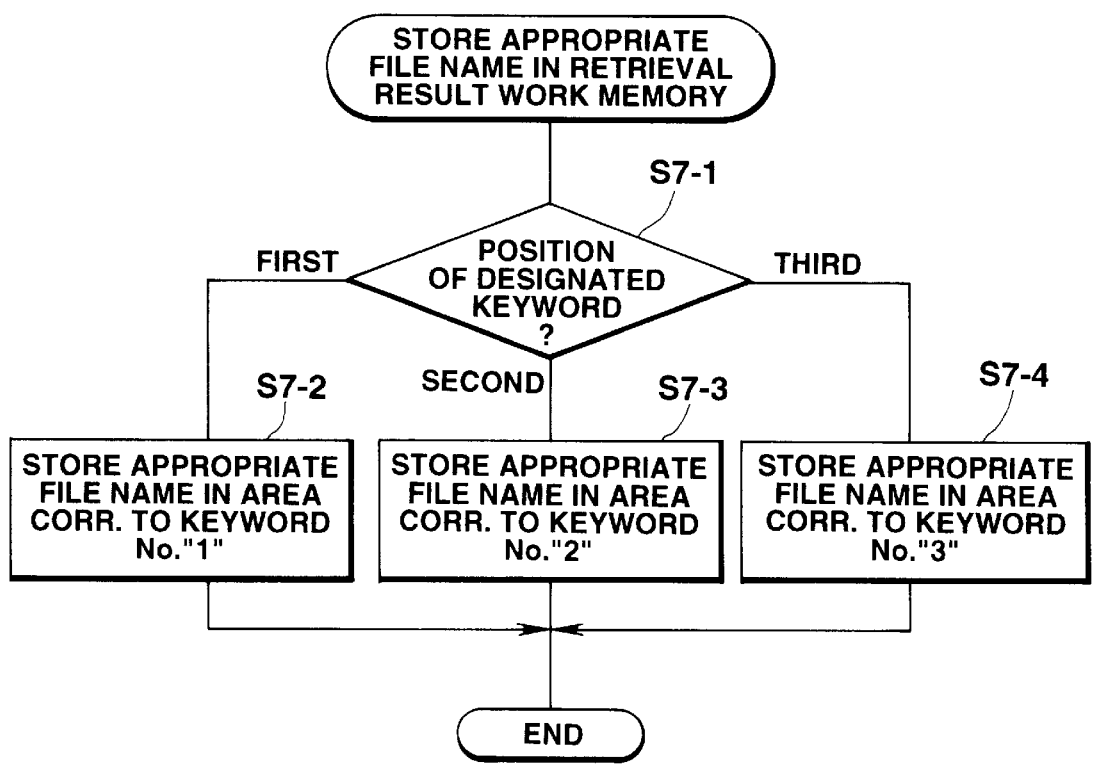
FIG. 11 is a flowchart of a step S7 of FIG. 10A where a file name is stored in the retrieval result work memory 17.

FIG. 11 is a flowchart indicative of the file name storage process in which the CPU locates the position of the designated keyword in the input buffer 15 (step S7-1). As a result, if the desired keyword is a first one, the CPU stores the appropriate file name in an area corresponding to the keyword No. "1" in the retrieval result work memory 17 (step S7-2); if the designated keyword is a second one, the CPU stores the appropriate file name in an area corresponding to the keyword No. "2" in the retrieval result work memory 17 (step S7-3); and if the designated keyword is a third one, the CPU stores the appropriate file name in an area corresponding to the keyword No. "3" in the retrieval result work memory 17 (step S7-4). FIG. 12A shows an example in which "tent" alone is input in the input buffer 15. The CPU stores the file name FIG. 001 where the character string "tent" is used as image classification data in an area corresponding to the keyword No. "1" in the image classification data memory 16.

Figure 10A:
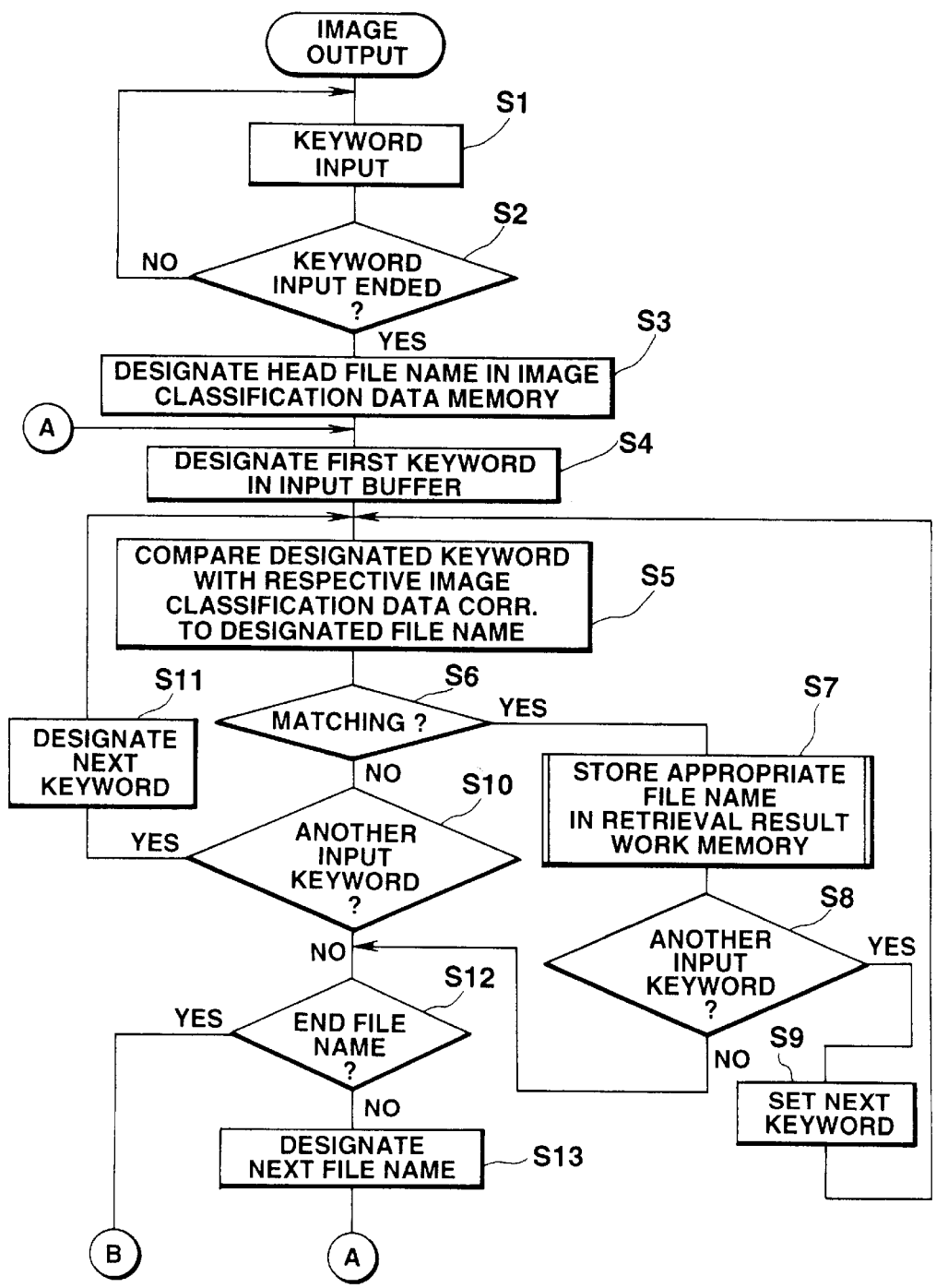
FIGS. 10A, 10B each show a part of a complete flowchart of an image output operation.

Control then passes to step S8 of FIG. 10A, where the CPU checks whether there is another keyword in the input buffer 15. Since in this case only one kind of keyword has been input, control passes to step S12, where the CPU checks whether the designated file name is the end one in the image classification data memory 16. Since the head file name is designated now, the CPU designates the next file name FIG. 002 (step S13). Control then returns to step S4, where the CPU similarly designates the first keyword "tent" in the input buffer 15 and checks whether this character string is contained in the respective image classification data corresponding to the file name FIG. 002 (step S5, S6). In this case, since no corresponding character string exists, control passes to step S10, where the CPU checks whether there are any other keywords in the input buffer 15. Since now only one kind of keyword has been input in the input buffer 15, the CPU sequentially designates the next file name while iterating the above operations until the end file name is designated.

Figure 12B:
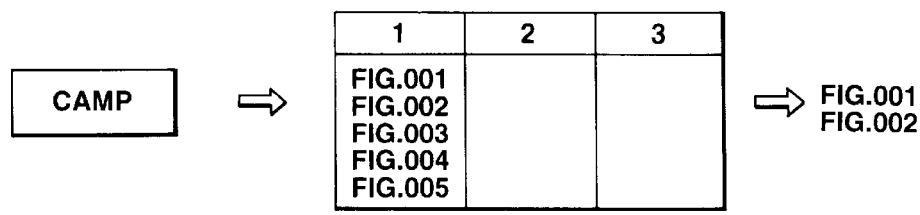

FIG. 12A shows that there is only the appropriate file name FIG. 001. If a character string "camp" is input as a keyword as shown in FIG. 12B, this character row is contained in the image classification data FIG. 001, FIG. 002, . . . Thus, a plurality of corresponding file names are stored in the keyword No. 1 area of the retrieval result work memory 17.

Figure 12C:
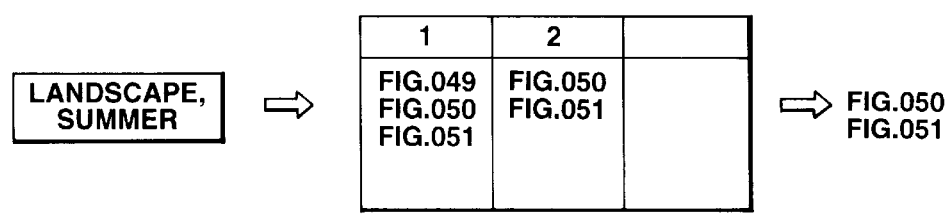
Figure 12D:
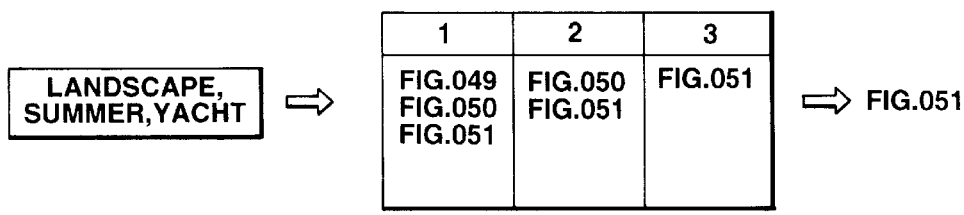
Figure 12E:
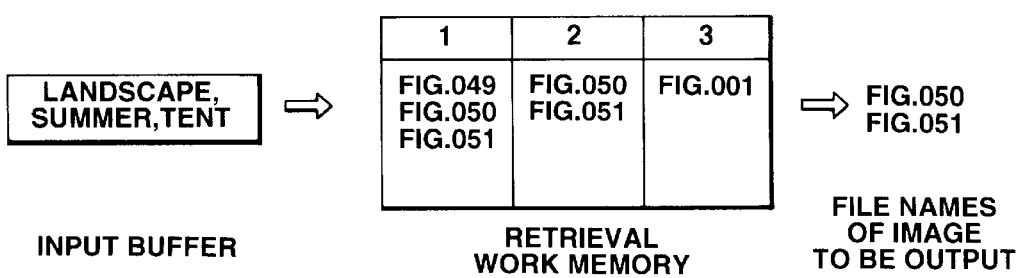

As shown in FIGS. 12C–12E, if a plurality of keywords are input, the above operation is iterated for each keyword.

More specifically, as shown in FIG. 12C, assume that a character string "landscape, summer" has been input as keywords, FIG. 049 is first retrieved as the file name using a first keyword "landscape" as the image classification data and stored in the keyword No. "1" area of the retrieval result work memory 17 (steps S6, S7). Since the CPU detects that there is another keyword at the next step S8, control passes to step S9, where the CPU designates the next keyword "summer". Control then returns to step S5. In this case, since no "summer" is contained in the image classification data corresponding to the file name FIG. 049, the CPU detects this fact at step S6. Control then passes to step S10, which checks whether there is another input keyword. In this case, there is no other keyword, so that the CPU designates the next file name FIG. 050 (step S13) on the condition that the file name is not the end one (step S12). Control then returns to step S4, where the CPU designates the first keyword "landscape". In this case, since the "landscape" is contained in the image classification data corresponding to the file name FIG. 050, the CPU stores the file name FIG. 050 in a keyword No. "1" area of the retrieval result work memory 17 (step S7). The CPU then designates the next keyword "summer" (step S9). Since this character string is also contained in the image classification data of the appropriate file name, the CPU stores the appropriate file name in the retrieval result work memory 17 (step S7). At this time, since this keyword is the second one, the CPU stores the file name FIG. 050 in a keyword No. "2" area of the retrieval result work memory 17. Thereafter, the CPU iterates a similar operation until the end file name, at which time the contents of the retrieval result work memory 17 are as shown in FIG. 12C.

FIGS. 12D and 12E show that three kinds of keywords have been input. The first and second keywords are similar to those in FIG. 12C. FIG. 12D shows an example where a character string "yacht" has been input as a third keyword. FIG. 12E shows an example where a character string "tent" has been input as a third keyword. Since the image classification data matching with the third keyword is the file name FIG. 051 in the case of FIG. 12D, and the file name FIG. 001 in the case of FIG. 12E, the CPU stores the appropriate file names in the respective keyword No. "3" areas of the retrieval result work memory 17.

Figure 10B:
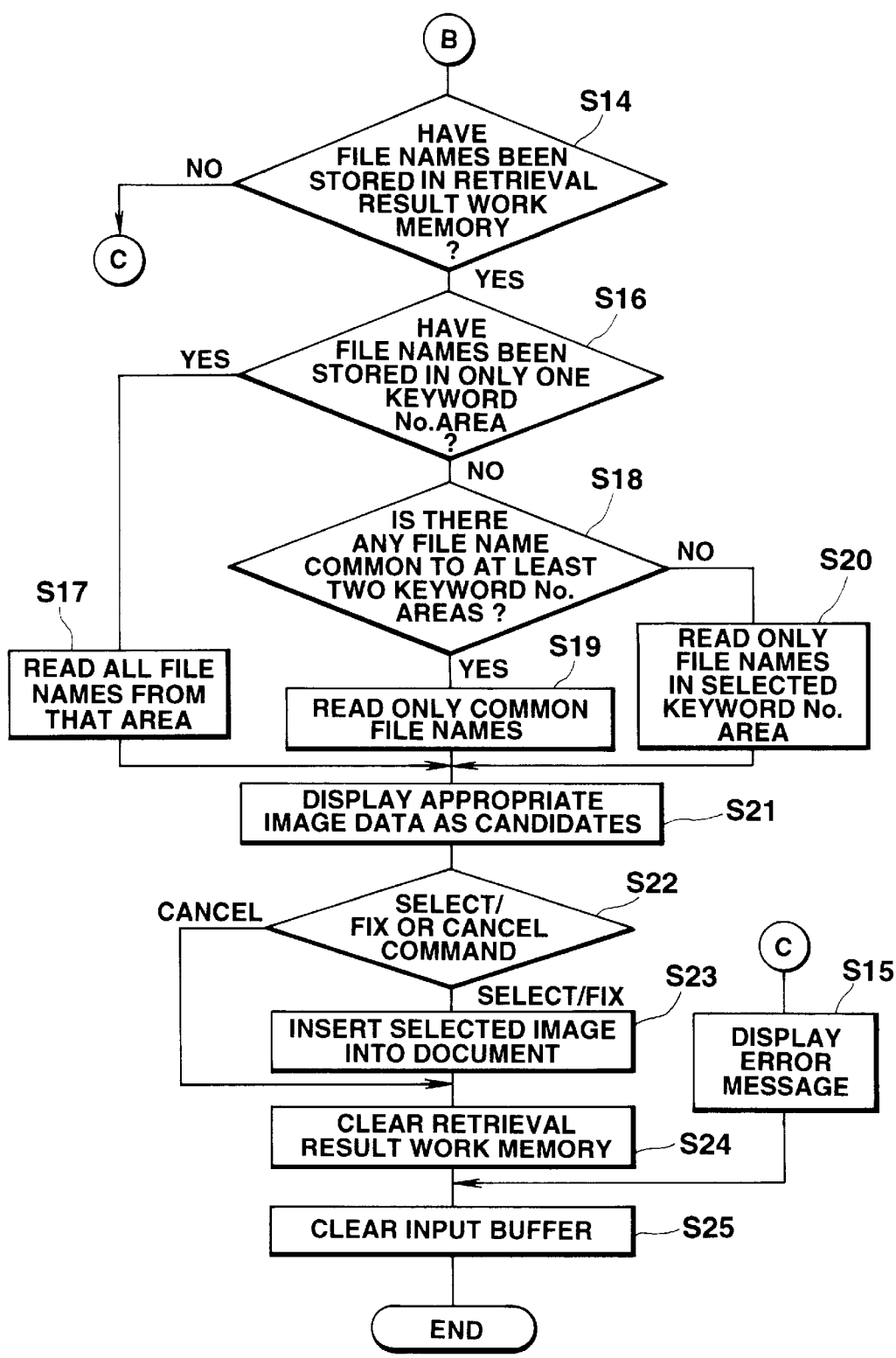

When the CPU has completed its retrieval of the contents of the image classification data memory 6 up to its end file name on the basis of the input keyword, control passes to step S14 of FIG. 10B, where the CPU checks whether the file names have been stored in the retrieval result work memory 17. If not, the CPU displays an error message that there is no appropriate image (step S15) and clears the input buffer 15 (step S25).

If the file names have been stored in the retrieval result work memory 17, the CPU checks whether the file names have been stored in only one keyword No. area (step S16). If there is only one kind of input keyword, as shown in FIGS. 12A, 12B, file names are stored only in the keyword No. "1" area. Even when a plurality of keywords has been input, file names can be stored in only the keyword No. "2" or "3" area. As just described above, if file names have been stored in only one keyword No. area, the CPU reads out all the file names from that area (step S17).

If file names have been stored in more than two keyword areas, control passes to step S18, where the CPU checks whether there is a common file name among the respective file names stored in at least two keyword No. areas. In the case of FIG. 12C, the file names FIG. 050 and FIG. 051 are common to two keyword No. areas while in the case of FIG. 12D, there is a file name FIG. 051 common to three keyword number areas. In the case of FIG. 12E, there are file names FIG. 050 and FIG. 051 common to two keyword No. areas. In this case, the file name FIG. 001 in the keyword No. "3" area is neglected. As Just described above, if there are file names common to at least two keyword No. areas, the CPU reads out all the common file names from the retrieval result work memory 17 (step S19).

If the file names stored in more than two keyword number areas differ from each other and if there are no file names common to them, control passes to step S20, where the CPU displays a message indicating that fact and a list of keywords in the input buffer 15. When the user selects any particular keyword from the list, the CPU reads only file names in the retrieval result work memory 17 corresponding to the selected keyword.

When the CPU reads a file name(s) from the retrieval result work memory 17 in this way, the CPU accesses the image memory 18 with this file name(s), and displays the appropriate image data as a candidate(s) on the display 20 (step S21). If a desired image is displayed in the list of image data as candidates, the CPU gives a selecting/fixing command through the keyboard 13 to select and fix that image. If not, the user keys in a command to cancel the image outputting operation (step 22). If a selecting/fixing command is input, the CPU performs insertion of the selected image into the document (step S23), and clears the retrieval result work memory 17 and the input buffer 15 (steps S24, S25). If a cancel command is input, the CPU performs no image insertion process and clears the retrieval result work memory 17 and the input buffer 15 (steps S24, S25).

Third Embodiment

Figure 13:
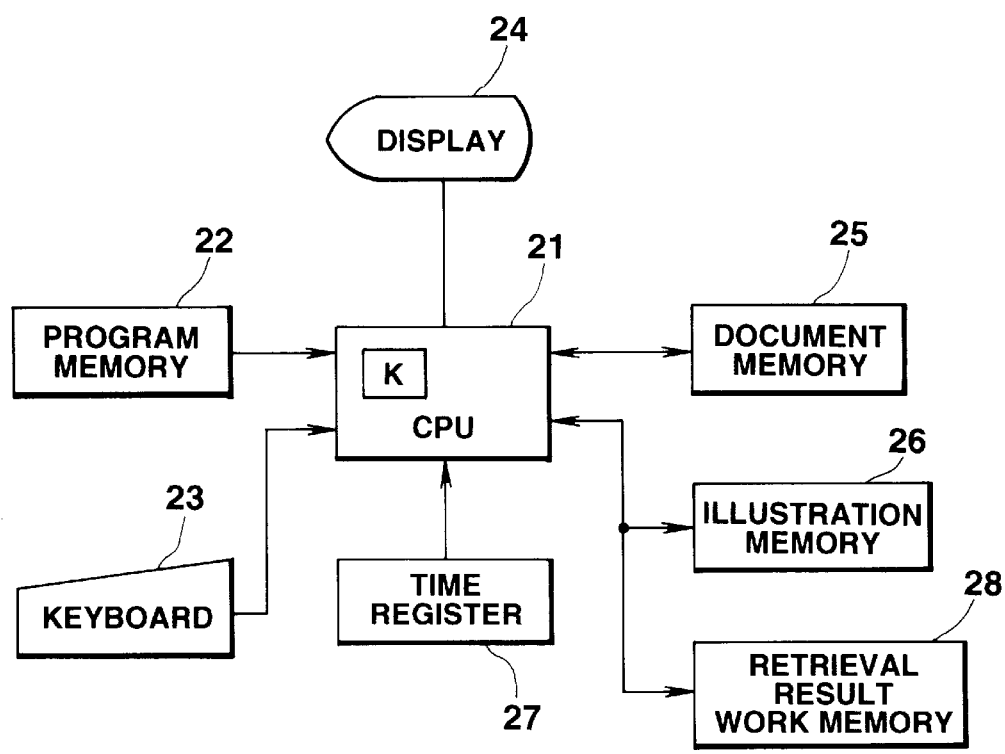
FIG. 13 is a block diagram of the structure of an image output device in a third embodiment of the present invention.

A third embodiment of the present invention will be described with reference to FIGS. 13–18. FIG. 13 is a block diagram of an image output device in a word processor. A CPU 21 controls the whole operation of this image output device in accordance with various programs stored in a program memory 22. When the CPU 21 receives an image output command through a keyboard 23, the CPU 21 starts up an image output program in the program memory 22.

The keyboard 23 is used to input various commands including an image output command, and document data. Document data input through the keyboard 23 is displayed on the display 24 and is then stored in a document memory 25.

As shown in FIG. 14, an illustration memory 26 has a structure which stores a (sequential) illustration number (sequential number), image classification data, illustration data, and month data for each illustration. The image classification data represents "meetings" such as, for example, a Christmas party, a New Year's party, a get-together; and "sport" such as skiing, skating or baseball. The month data is composed of 12 bits corresponding to January–December and represents a month where an image is output. For example, month data corresponding to an illustration No. "1" is composed of "1" at its first bit position and all "0's" at its other bit positions, which indicates that the image data corresponding to the illustration No. "1" (an illustration image which causes the user to imagine a New Year's party represents an image output in January). Similarly, month data corresponding to an illustration No. "50" is composed of 1's at its first-third and twelfth bit positions and "0's" at all its other bit positions, which indicates that image data corresponding to the illustration No. "50" (an illustration which causes the user to imagine skiing) represents an image output in January–March and December. Month information corresponding to illustrations unrelated to seasons and times such as "get-together" and "baseball" is composed of "1's" set at all its twelve bit positions.

Figure 15:
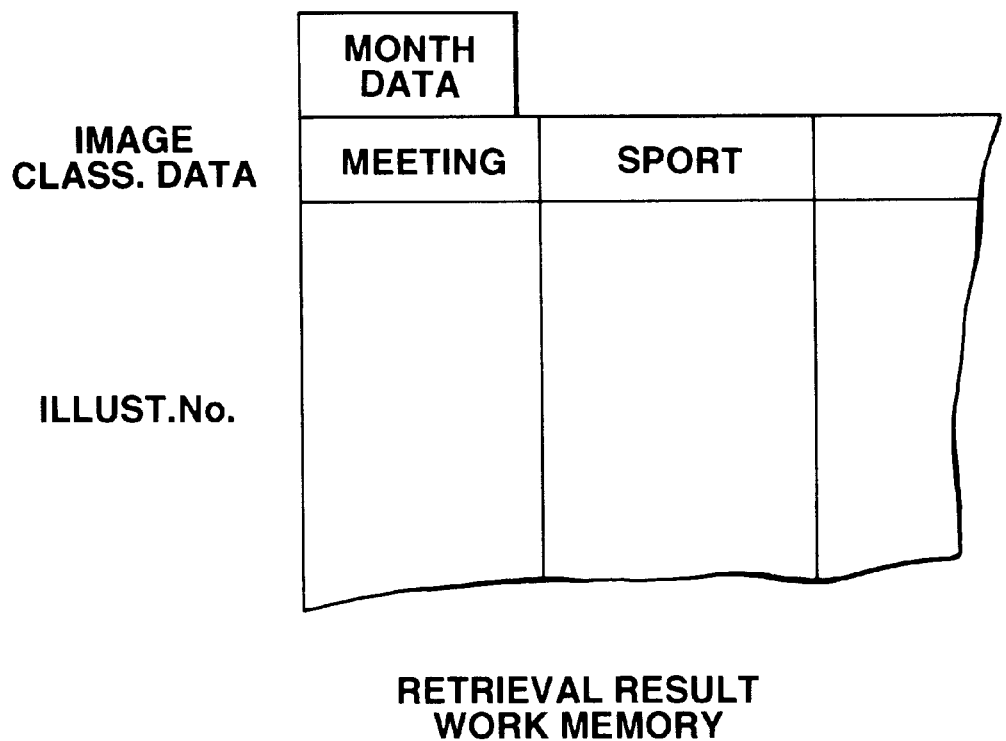
FIG. 15 shows the structure of a retrieval result work memory 28 of the third embodiment.

A time register 27 records the current time (year, month, date, hour, minute, second). The CPU 21 accesses an illustration memory 26 on the basis of the recorded month data, reads an illustration No. corresponding to the current month from the illustration memory 26 and stores it in a corresponding classification in a retrieval result work memory 28. FIG. 15 shows the structure of the retrieval result work memory 28, which includes an area which stores an illustration No. as the result of the retrieval and an area which stores month data for which the illustration memory 26 is searched on the basis of the month data recorded in the time register 27 for each of the classifications corresponding to image classification data in the illustration memory 26, and stores the number of the illustration corresponding to the current month in the appropriate classification area. The retrieval result work memory 28 is composed of a random access memory, whose contents are maintained by a backup cell (not shown) as in the time register 27 even when a main power supply (not shown) is turned off.

Figure 16:
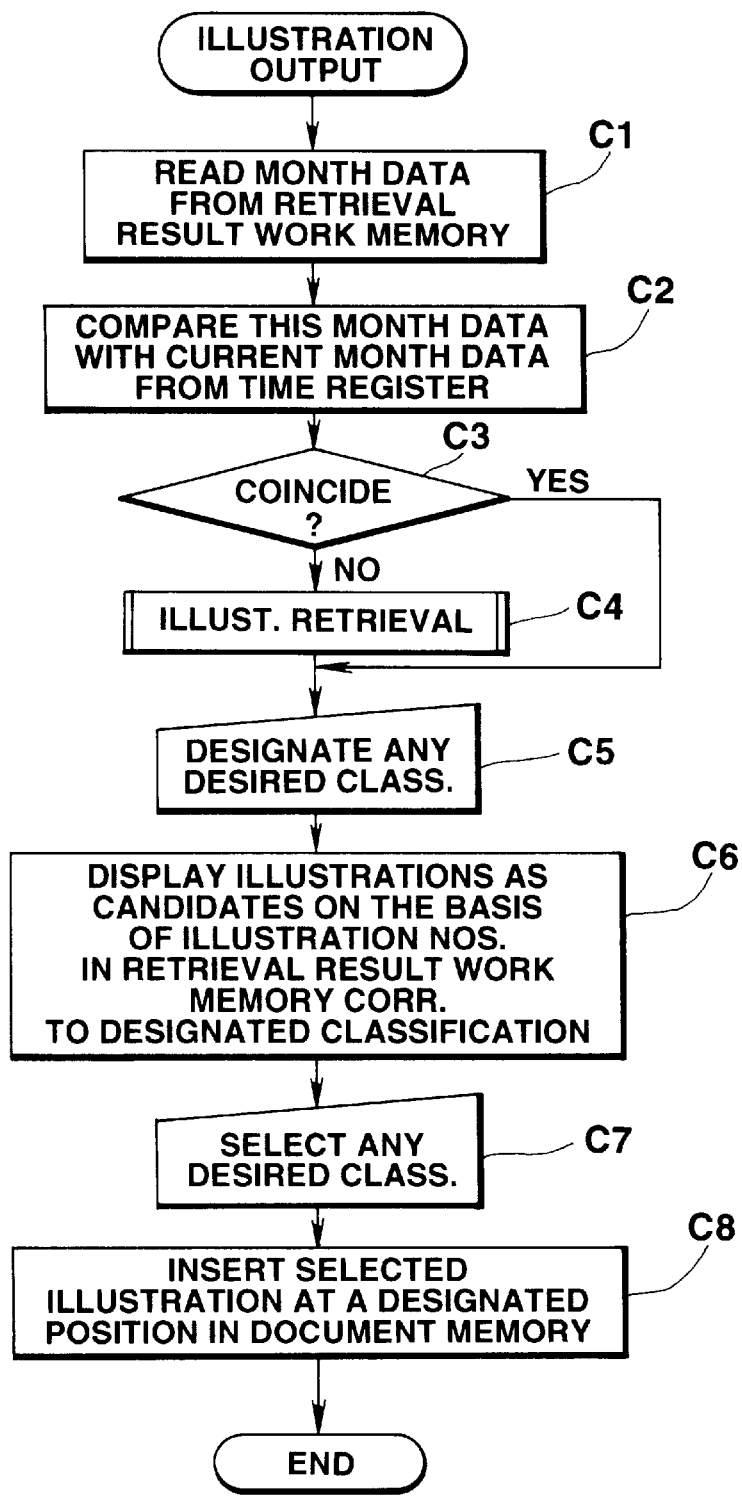
FIG. 16 is a flowchart of the illustration outputting operation of the third embodiment.

The operation of the present embodiment will be described next with reference to FIGS. 16 and 17. FIG. 16 is a flowchart indicative of the operation of the present embodiment performed when an image output command is input or received. First, the CPU 21 reads month data from the retrieval result work memory 28 (step C1), compares this month data with the current month data obtained in the time register 27 (step C2) and checks whether both coincide (step C3). If so, or if the number of an illustration corresponding to the current month is already stored in the appropriate classification area in the retrieval result work memory 28, there is no need for searching the illustration memory 26 again. If the contents of the retrieval result work memory 28 correspond to those of the last month rather than those of the current month or are in its initial state where no illustration number/month data is stored, the CPU 21 searches the illustration memory 26 on the basis of the current month data, and performs an illustration search process for storing the result of the search in the work memory 28 (step C4).

Figure 17:
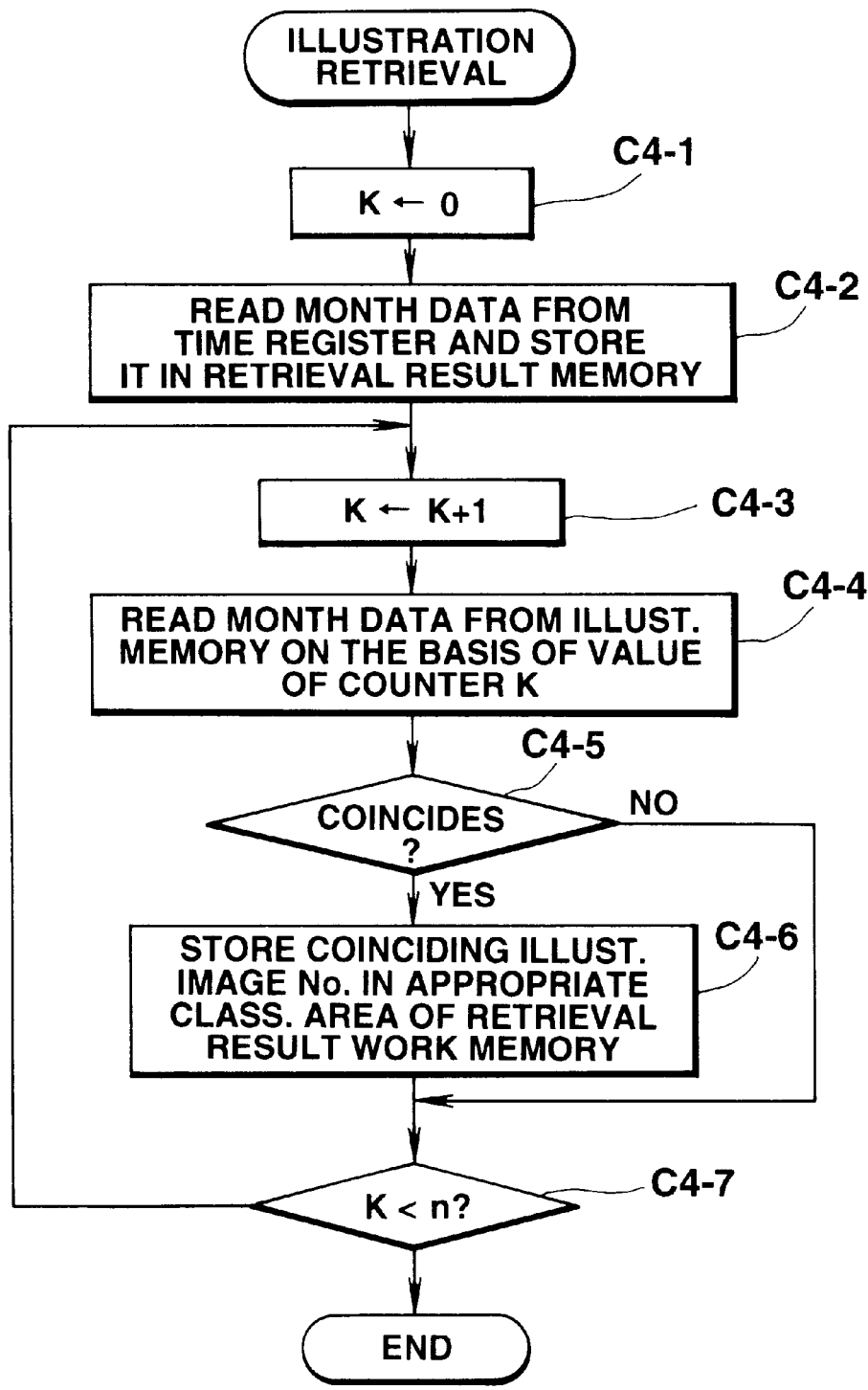
FIG. 17 is a flowchart explaining a step C4 of FIG. 16 directed to an illustration retrieval process.
Figure 18:
FIG. 18 shows an illustrative document in which an illustration is inserted.

FIG. 17 is a flowchart indicative of this illustration search process. First, the CPU 21 clears its illustration counter K which addresses illustration numbers one at a time in the illustration memory 26 (step C4-1). The CPU 21 then reads the current month data recorded by the time register 27 and stores this data in the month data area of the retrieval result work memory 28 (step C4-2). The CPU then increments the value of the illustration counter K by one to update the address (step C4-3). By this operation, the CPU first designates the illustration number "1" of the illustration memory 26 in accordance with the value of the illustration counter K, reads month data corresponding to the illustration number, and compares the read month data with the current month data obtained by the time register 27 (step C4-4). That is, the CPU locates a bit position corresponding to the current month among the month data in the illustration memory 26 corresponding to the designated illustration number and checks whether "1" is set at the appropriate bit position.

As a result, when the CPU 21 detects that "1" is set and the image output time coincides with the current month (step C4-5), control passes to step C4-6, where the CPU reads from the illustration memory 26 image output data corresponding to the coinciding designated illustration number to access the corresponding classification area of the retrieval result work memory 28, and stores the designated illustrated number in that classification area. When the CPU 21 detects no coincidence at step C4-5, the CPU skips over the storage of the designated illustration number into the retrieval result work memory 28. The CPU then returns to a process for incrementing the value of the illustration counter K (step C4-3) on the condition that the value of the illustration counter K is less than the end illustration number n of the illustration memory 26 (step C4-7).

Such operation is iterated until the value of the illustration counter K reaches n. As a result, if month data set for each image beforehand as an image output time in the illustration memory 26 corresponds to the current month, all the appropriate illustration image numbers are stored in the respective classification areas in the retrieval result work memory 28. If the time data obtained by the time register 27 indicates "January", this word is set in the month data area of the retrieval result work memory 28, and illustration numbers corresponding to January are stored for the respective related "meeting", "sports", . . . areas of the retrieval result work memory 28.

Such illustration retrieval process is performed as long as the contents of the retrieval result work memory 28 do not correspond to the current month when an illustration output command is received, as mentioned above. If data corresponding to the current month is already stored in the retrieval result work memory 28 when the last illustration is output, such illustration retrieval process is not performed. Control then passes to step C5 of FIG. 18, where when the user designates any particular classification in accordance with the display of the guidance that data on the classification of an illustration to be output should be input, the CPU 21 sequentially reads illustration numbers in the retrieval result work memory 28 corresponding to the designated classification at step C6, accesses the illustration memory 26 on the basis of the illustration numbers, reads the corresponding image data on the basis of the illustrated numbers and displays the illustrations as candidates, one of which is to be selected on the display 24. When the user selects any illustration through the keyboard 23 (step C7), the CPU 21 inserts the selected illustration at a designated position in the document memory 25 (step C8). The position where the illustration is inserted is the current cursor position. Before the image output command is input, the cursor may be moved beforehand to any particular designated position where an image should be inserted. Alternatively, after the candidate is selected at step C7, the cursor may be moved to any designated position where the image should be inserted.

Since in the present embodiment month data indicative of a time when each image is output is set in the illustration memory 26 in correspondence to that illustration in the present embodiment, as described above, an illustration corresponding to the current month recorded by the time register 27 is output automatically. In this case, since the numbers of the illustrations corresponding to the current month are disposed at appropriate positions for the respective classifications and stored in the retrieval result work memory 28, illustrations corresponding to the current month can be output for the respective classifications when a desired illustration is output. As just described above, the illustrations are output on the basis of the month data. Thus, the illustrations are not required to be classified in a fine classification system as is in the prior art, but may be classified in a coarser classification system including "meeting", "sports". Thus, when any particular classification is designated through the keyboard 23, there is no need for being strictly conscious of a classification to which a desired illustration belongs, as is in the prior art, and the designation of a classification is facilitated.

What is claimed is:

1. A document data creating device which creates document data containing an image, the document data creating device comprising:

input means for inputting document data;

document storage means for storing document data input by said input means;

a display for displaying the document data stored in the document storage means;

image storage means for storing a plurality of images;

term information storage means for storing a plurality of items of term information on the plurality of images stored in said image storage means in correspondence to the plurality of images;

time register means for recording a present date;

pasting position specifying means for displaying a cursor on said display, for moving the cursor to any position on said display, and for specifying with the position of the cursor any pasting position where an image is to be pasted in the document data displayed on the display;

specifying means for specifying the pasting of an image to the document data to thereby create document data containing the image;

retrieving means, responsive to said specifying means specifying the pasting of the image, for retrieving from said term information storage means an item of term information corresponding to the present date recorded by said time register means and for retrieving an image corresponding to the item of term information; and creating means for pasting the image retrieved by said retrieving means, at the pasting position in the document data specified by said pasting position specifying means to create document data containing the image corresponding to the present date.

2. A document data creating device which creates document data containing an image, the document data creating device comprising:

an input device for inputting document data;

a document storage device which stores document data input by said input device;

a display which displays the document data stored in the document storage device;

an image storage device which stores a plurality of images;

a term information storage device which stores a plurality of items of term information on the plurality of images stored in said image storage device in correspondence to the plurality of images;

a time register device which records a present date;

a pasting position specifying device which displays a cursor on said display, moves the cursor to any position on said display, and specifies with the position of the cursor any pasting position where an image is to be pasted in the document data displayed on the display;

a specifying device which specifies the pasting of an image to the document data to thereby create document data containing the image;

a retrieving device, responsive to said specifying device specifying the pasting of the image, which retrieves from said term information storage device an item of term information corresponding to the present date recorded by said time register device and which retrieves an image corresponding to the item of term information; and a creating device which pastes the image retrieved by said retrieving device, at the pasting position in the document data specified by said pasting position specifying device to create document data containing the image corresponding to the present date.

* * * * *

UNITED STATES PATENT AND TRADEMARK OFFICE
CERTIFICATE OF CORRECTION

PATENT NO.   : 6,108,674
DATED        : August 22, 2000
INVENTOR(S)  : Murakami et al.

It is certified that error appears in the above-identified patent and that said Letters Patent is hereby corrected as shown below:

<u>Title page,</u>
Item [56] References Cited,
"U.S. PATENT DOCUMENTS",

| insert -- 5,303,361 | 4/1994 | Colwell et al. |
| 5,321,933 | 6/1994 | Chang et al. |
| 5,533,186 | 7/1996 | Tanahashi et al. |
| 5,579,471 | 11/1996 | Barber et al. |
| 5,598,557 | 1/1997 | Doner et al. |
| 5,619,709 | 4/1997 | Caid et al. |
| 5,692,176 | 11/1997 | Holt et al. --, |

"OTHER PUBLICATIONS",
insert -- Calendar Creator Plus™ Gold Edition for Windows®, Version 2.0, SoftKey International, Inc., 1995, pp. 2, 3, 9, 24, 25, 86, 98
"SoftKey International Inc. released Calendar Creator Plus Version 2.0 for Windows", Computer Retail Week, 4/94, p. 36 --.

Signed and Sealed this

Sixth Day of November, 2001

Attest:

*Nicholas P. Godici*

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO. : 6,108,674
DATED : August 22, 2000
INVENTOR(S) : Murakami et al.

It is certified that error appears in the above-identified patent and that said Letters Patent is hereby corrected as shown below:

Title page,
Item [56] References Cited,
"U.S. PATENT DOCUMENTS",

| insert -- 5,303,361 | 4/1994 | Colwell et al. |
| 5,321,933 | 6/1994 | Chang et al. |
| 5,533,186 | 7/1996 | Tanahashi et al. |
| 5,579,471 | 11/1996 | Barber et al. |
| 5,598,557 | 1/1997 | Doner et al. |
| 5,619,709 | 4/1997 | Caid et al. |
| 5,692,176 | 11/1997 | Holt et al. --, |

"OTHER PUBLICATIONS",
insert -- Calendar Creator Plus$^{TM}$ Gold Edition for Windows®, Version 2.0, SoftKey International, Inc., 1995, pp. 2, 3, 9, 24, 25, 86, 98
"SoftKey International Inc. released Calendar Creator Plus Version 2.0 for Windows", Computer Retail Week, 4/94, p. 36 --.

Signed and Sealed this

Fourth Day of December, 2001

Attest:

*Nicholas P. Godici*

NICHOLAS P. GODICI
*Attesting Officer*  *Acting Director of the United States Patent and Trademark Office*